Aug. 12, 1924.
A. J. BURNHEIMER
1,504,938
ONION WEEDER
Filed May 31, 1923
2 Sheets—Sheet 1
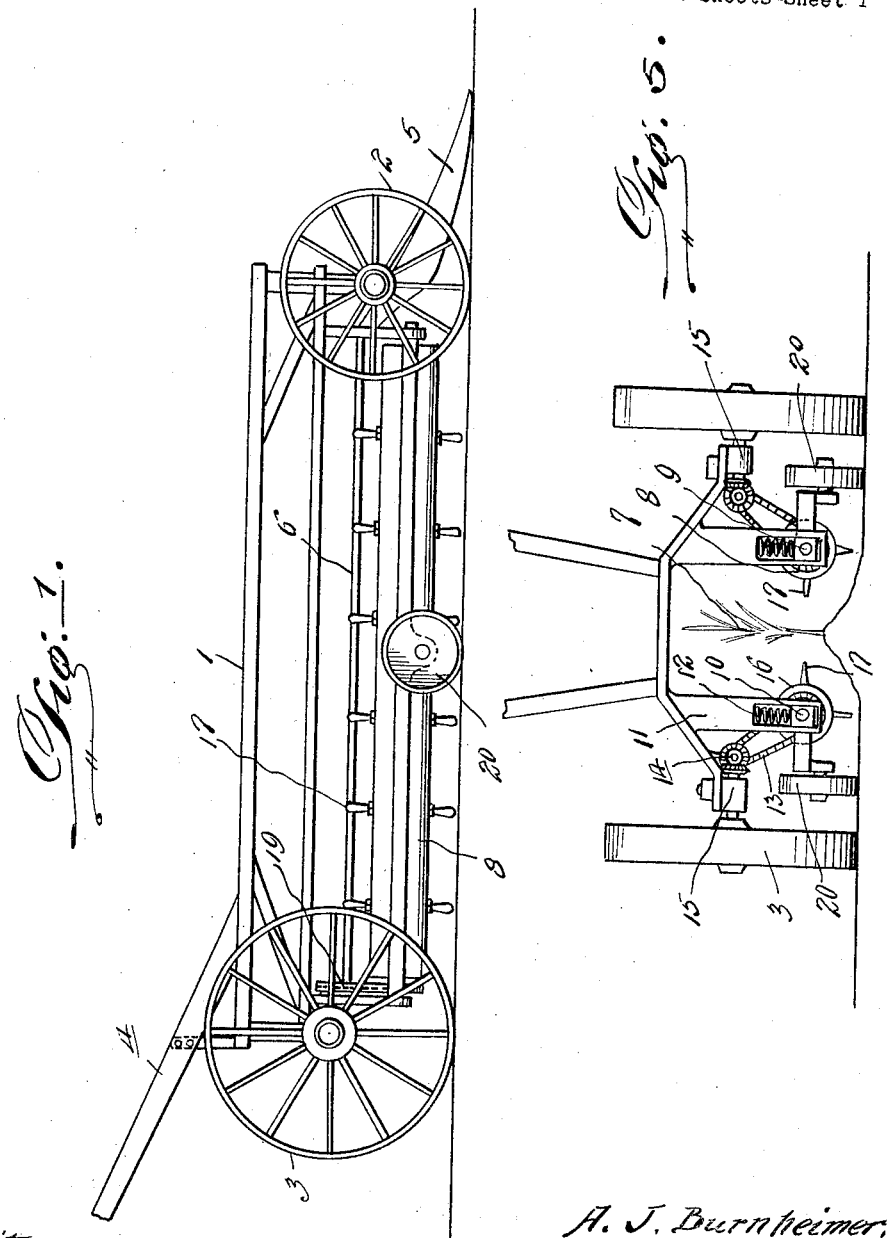

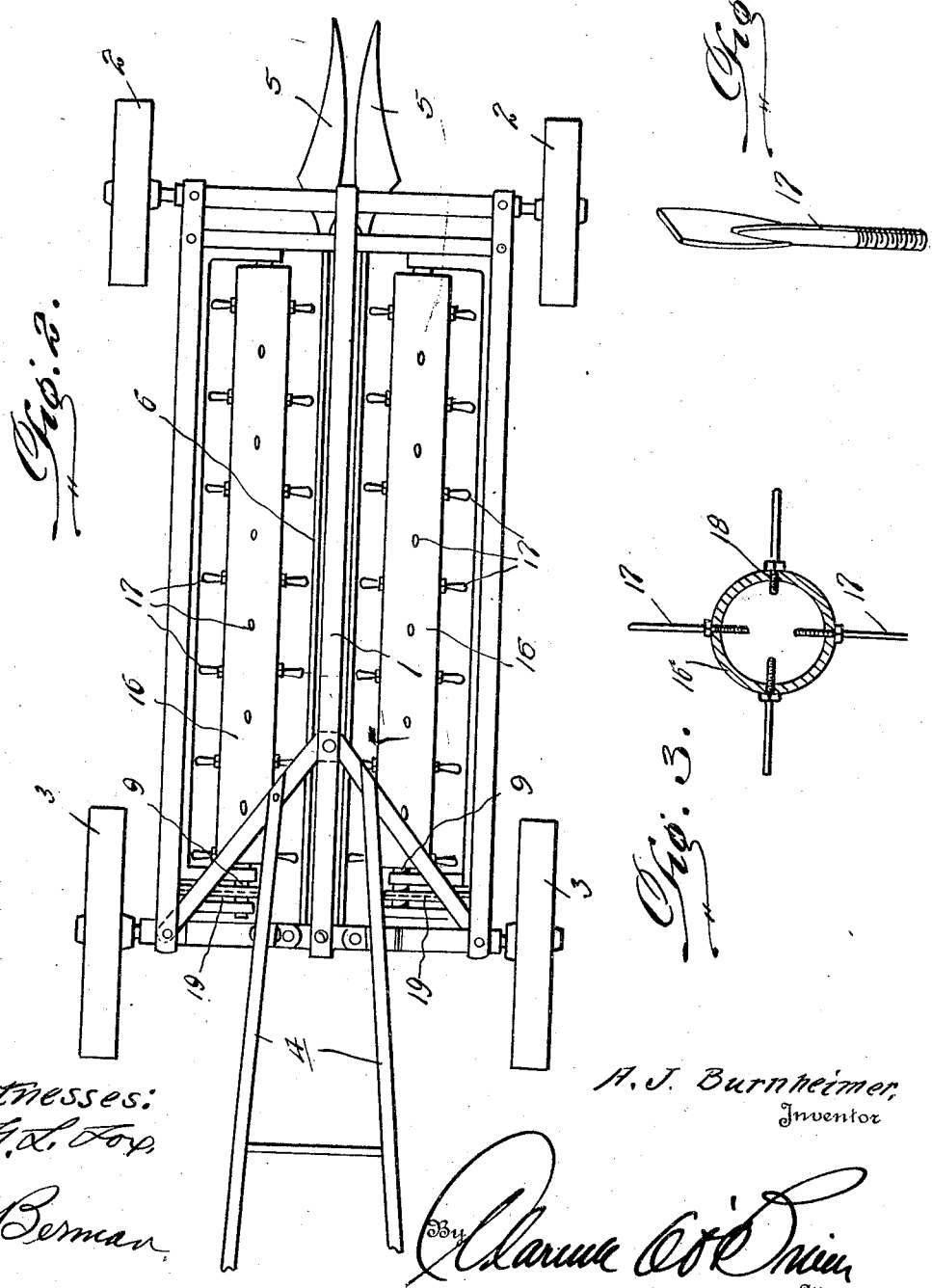

Patented Aug. 12, 1924.

1,504,938

UNITED STATES PATENT OFFICE.

AARON J. BURNHEIMER, OF KIMMELL, INDIANA.

ONION WEEDER.

Application filed May 31, 1923. Serial No. 642,456.

*To all whom it may concern:*

Be it known that AARON J. BURNHEIMER, a citizen of the United States, residing at Kimmell, in the county of Noble and State of Indiana, has invented certain new and useful Improvements in Onion Weeders, of which the following is a specification.

This invention has reference to improvements in onion weeders and its object is to provide a weeding machine for growing onions without cutting the tops from the onions and so injuring them.

There is provided a weeding drum having weeding fingers projecting therefrom in conjunction with a rail, a frame and an onion guard.

In accordance with the invention the weeder is mounted on four wheels and there are two weeder drums one on each side of the row of onions to be driven to the right and left of the hind wheel. The drums are constructed out of pipes with hollows tapped so as to screw fingers into them in such manner that they may be riveted in place and permitting the renewal of the fingers when necessary.

The fingers do not whip through the onions to their damage and in fact obviate in a large degree the damage of the young plants.

The weeder drums are made adjustable to the rows up and down so the operator can set them as needed.

The fingers are formed with flat extremities with the points rounded and smooth and just long enough to knock out the weeds and to work the fresh dirt up to the row instead of digging the dirt away from the row as heretofore has been the practice.

The invention will be best understood from a consideration of the following detailed description taken in connection with the accompanying drawings forming part of this specification with the understanding, however, that the invention is not confined to any strict conformity with the showing in the drawings but may be changed and modified so long as such changes and modifications mark no material departure from the salient features of the invention as expressed in the appended claim.

In the drawings:

Figure 1 is a side elevation of an onion weeder constructed in accordance with my invention;

Figure 2 is a top plan view thereof;

Figure 3 is a cross section through one of the weeder drums;

Figure 4 is a perspective view of one of the weeder blades;

Figure 5 is an end view of the weeder.

Referring to the drawings, there is shown a vehicle 1 mounted on front and rear wheels 2 and 3, respectively, and provided with guide handles 4 by means of which the vehicle may be pushed over the ground and at the forward end of the vehicle there is provided a gatherer fork 5 for engaging the pressed onions to guide them over the onion raisers 6 so that the onion plants, indicated at 7, are properly directed through the machine.

On opposite sides of the central line of the machine corresponding to opposite sides of the onion plants 7 are rotary members 8 mounted on shafts 9 carried in bearings 10 mounted on the lower ends of hangers 11 with supporting springs 12. The shafts 9 are each individually connected by a sprocket chain 13 to another shaft 14 carried by a bearing 15 by the main frame of the machine so that the rear wheels 3 will engage the shafts 14 and rotate the other shafts 9. Mounted on each shaft 9 is a roller 16 having rotating pins 17 projecting therefrom. These pins are screwed into sockets 18 to constitute lifters for the onion plants and driven by chain connections 19 from the rollers 16.

Arrangement is such that when the machine is travelling over the ground the rollers 16 receive motion from the chains 13 in such direction as to lift the onions through the intermediary of the chains 19 and elevate them to the onion raisers 6 along which the lifted onion plants travel as the machine is moved over the ground. To facilitate the lifting of the onion plants the outer ends of the pins 17 will engage under the onion plants 7 and raise them so that they travel along the raisers 6 in elevated position. The outer ends of the pins 17 as they lift from the ground engage under the onion plants and support them while the machine is moved over the ground. The springs 12 serve to hold the onion engaging drums down during the progress of the machine while the pins 17 serve to lift the onions to the level of the raisers 6.

The onion lifting drums are driven from opposite sides of the machine with the pins 17 of sufficient size to clean out the weeds.

The onion raiser or rail 6 is set just inside of the points of the pins 17 to support the onion stack to keep them in the center between the fingers. The onion raisers 6 lift the upper ends of the onion plants over the fingers to protect them from getting cut or damaged. The trouble has heretofore been that the weeder pins 17 cut the tops, pull the plants and have proved detrimental to a large percentage of the crop, whipping through the plants. However, the weeders on the present invention does away with this and large damage of the onion crop is avoided. The weeder drums are built adjustable to the row of plants up and down so the operator can set them to suit himself. The fingers are to be flat and the points rounded and smooth and just long enough to knock out the weeds and to work fresh dirt up to the row in place of digging the dirt away from the row as is the case with other weeders.

What is claimed is:

A weeder comprising a wheel mounted frame having vertically disposed spaced guides, bearings slidably mounted in the guides, springs located in the guides and resting upon the bearings and tending to hold the bearings in lowered position in the guides, a frame connected with the bearings and bridging the space between the guides, a ground engaging wheel journalled upon said connecting frame at a point midway between the ends thereof, and a roller journalled in the bearings and provided with radially disposed blades, said roller being disposed longitudinally of the wheel mounted frame.

In testimony whereof I affix my signature.

AARON J. BURNHEIMER.